(12) United States Patent
Stafford

(10) Patent No.: US 11,082,683 B2
(45) Date of Patent: *Aug. 3, 2021

(54) DIGITAL INTER-PUPILLARY DISTANCE ADJUSTMENT

(71) Applicant: Sony Interactive Entertainment Inc., Tokyo (JP)

(72) Inventor: Jeffrey R. Stafford, Redwood City, CA (US)

(73) Assignee: SONY INTERACTIVE ENTERTAINMENT INC., Tokyp (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,458

(22) Filed: Oct. 21, 2019

(65) Prior Publication Data

US 2020/0053349 A1    Feb. 13, 2020

Related U.S. Application Data

(63) Continuation of application No. 15/461,225, filed on Mar. 16, 2017, now Pat. No. 10,455,224, which is a
(Continued)

(51) Int. Cl.
*A63F 9/24*     (2006.01)
*H04N 13/327*   (2018.01)
(Continued)

(52) U.S. Cl.
CPC ........... *H04N 13/327* (2018.05); *A63F 13/22* (2014.09); *A63F 13/40* (2014.09); *G02B 7/12* (2013.01);
(Continued)

(58) Field of Classification Search
CPC ........... G02B 27/0172; G02B 27/0093; G02B 2027/0178; G02B 2027/0138;
(Continued)

(56) References Cited

U.S. PATENT DOCUMENTS 3,543,666 A    12/1970   Kazel
3,601,377 A     8/1971   Charles
(Continued)

FOREIGN PATENT DOCUMENTS

CN    101726854 A    6/2010
CN    102540467 A    7/2012
(Continued)

OTHER PUBLICATIONS

Co-Pending U.S. Appl. No. 14/187,127, to Jeffrey R. Stafford, filed Feb. 21, 2014.
(Continued)

*Primary Examiner* — Gims S Philippe
(74) *Attorney, Agent, or Firm* — JDI Patent; Joshua Isenberg; Robert Pullman

(57) ABSTRACT

Stereoscopic viewing systems may be adjusted for a user's inter-pupillary distance (IPD). An inter-pupillary distance (IPD) value is determined from a signal from a position sensitive device coupled to two moveable sighting fixtures mounted to a head mounted display (HMD) having two fixed optics configured for a specific inter-pupillary distance. The position sensitive device is configured to produce a signal that corresponds to a distance between the two sighting fixtures. The images are warped with a processor to optimize display of the images with the two fixed optics for the determined IPD value.

18 Claims, 6 Drawing Sheets

Related U.S. Application Data continuation of application No. 14/187,127, filed on Feb. 21, 2014, now Pat. No. 9,600,068.

(60) Provisional application No. 61/779,272, filed on Mar. 13, 2013.

(51) Int. Cl.

| | | |
|---|---|---|
| *G06F 3/01* | (2006.01) | |
| *H04N 13/344* | (2018.01) | |
| *G02B 7/12* | (2021.01) | |
| *G02B 27/01* | (2006.01) | |
| *A63F 13/22* | (2014.01) | |
| *A63F 13/40* | (2014.01) | |
| *H04N 13/383* | (2018.01) | |
| *H04N 13/324* | (2018.01) | |
| *H04N 13/398* | (2018.01) | |

(52) U.S. Cl.
CPC ........... *G02B 27/017* (2013.01); *G06F 3/013* (2013.01); *H04N 13/324* (2018.05); *H04N 13/344* (2018.05); *H04N 13/383* (2018.05); *H04N 13/398* (2018.05); *A63F 2300/301* (2013.01); *A63F 2300/8082* (2013.01); *G02B 2027/011* (2013.01); *G02B 2027/014* (2013.01); *G02B 2027/0116* (2013.01); *G02B 2027/0134* (2013.01); *G02B 2027/0181* (2013.01)

(58) Field of Classification Search
CPC ...... G02B 2027/014; G02B 2027/0187; G02B 27/017; G02B 27/0176; G02B 27/0179; G02B 2027/0185; G02B 2027/0132; G02B 7/12; H04N 13/327; H04N 13/383; H04N 13/324; H04N 13/398; H04N 13/344; A63F 13/22; A63F 13/40; G06F 3/013
USPC .......................................................... 463/31
See application file for complete search history.

(56) References Cited

U.S. PATENT DOCUMENTS

| | | | | |
|---|---|---|---|---|
| 6,009,564 | A * | 1/2000 | Tackles .................... | A61F 9/02 2/436 |
| 6,175,379 | B1 | 1/2001 | Uomori et al. | |
| 9,202,443 | B2 * | 12/2015 | Perez ............... | G06Q 20/40145 |
| 9,600,068 | B2 | 3/2017 | Stafford | |
| 2002/0005818 | A1 * | 1/2002 | Bruzzone .............. | G06F 1/1616 345/6 |
| 2002/0030163 | A1 | 3/2002 | Zhang | |
| 2005/0190180 | A1 | 9/2005 | Jin et al. | |
| 2006/0072206 | A1 * | 4/2006 | Tsuyuki ............... | H04N 13/344 359/631 |
| 2007/0118428 | A1 | 5/2007 | Akiyama et al. | |
| 2010/0002154 | A1 * | 1/2010 | Hua .................. | G02B 27/0172 349/11 |
| 2010/0073465 | A1 | 3/2010 | Park et al. | |
| 2010/0091027 | A1 | 4/2010 | Oyama et al. | |
| 2011/0169928 | A1 | 7/2011 | Gassel et al. | |
| 2012/0162764 | A1 | 6/2012 | Shimizu | |
| 2013/0208014 | A1 * | 8/2013 | Fleck ................. | G06K 9/00684 345/672 |
| 2014/0168264 | A1 * | 6/2014 | Harrison ............ | G02B 27/0176 345/633 |
| 2016/0065952 | A1 | 3/2016 | Han et al. | |
| 2017/0195663 | A1 | 7/2017 | Stafford | |

FOREIGN PATENT DOCUMENTS

| | | |
|---|---|---|
| GB | 2332062 B | 2/2000 |
| JP | 3575902 B2 | 10/2004 |
| JP | 2013044779 A | 3/2013 |
| KR | 20100054120 A | 5/2010 |

OTHER PUBLICATIONS

Co-Pending U.S. Appl. No. 61/779,272, to Jeffrey R. Stafford, filed Mar. 13, 2013.
Extended European Search Report dated Oct. 7, 2016 for European Patent Application No. 14780123.7.
Final Office Action for U.S. Appl. No. 14/187,127, dated Mar. 24, 2016.
Howlett, Eric: "Notes on LEEP ARV-1 Stereoscopic Viewer Optics" LeepVR, Feb. 1990. Retrieved from Web. http://www.leepvr.com/vieweroptics.php May 21, 2014.
International Search Report and Written Opinion for International Application No. PCT/US2014/018294, dated Aug. 14, 2014.
Non-Final Office Action for U.S. Appl. No. 15/461,225, dated Jan. 28, 2019.
Non-Final Office Action for U.S. Appl. No. 14/187,127, dated Jun. 18, 2015.
Non-Final Office Action for U.S. Appl. No. 14/187,127, dated Oct. 6, 2015.
Notice of Allowance for U.S. Appl. No. 15/461,225, dated Jun. 12, 2019.
Notice of Allowance for U.S. Appl. No. 14/187,127, dated Nov. 4, 2016.
Office Action dated May 16, 2018 for Chinese Patent Application No. 201480014285.2.
Office Action dated Aug. 3, 2017 for Chinese Patent Application 201480014285.2.
Warren Robinett: "Computational model for the stereoscopic optics of a head-mounted display", Proceedings of SPIE, vol. 1457, Jan. 1, 1991 (Jan. 1, 1991), pp. 140-160.

* cited by examiner

DIGITAL INTER-PUPILLARY DISTANCE ADJUSTMENT

CLAIM OF PRIORITY

This application is a continuation of U.S. patent application Ser. No. 15/461,225, filed Mar. 16, 2017, the entire disclosures of which are incorporated herein by reference. U.S. patent application Ser. No. 15/461,225 is a continuation of U.S. patent application Ser. No. 14/187,127, filed Feb. 21, 2014, the entire disclosures of which are incorporated herein by reference. U.S. patent application Ser. No. 14/187,127 claims the priority benefit of U.S. Provisional Patent Application No. 61/779,272, filed Mar. 13, 2013, the entire disclosures of which are incorporated herein by reference.

FIELD OF THE DISCLOSURE

Aspects of the present disclosure relate to stereoscopic 3D images and digital image adjustment.

BACKGROUND OF THE DISCLOSURE

Head mounted displays (HMDs) and stereoscopic viewing devices (SVDs) have two lenses or apertures that a user can look into to see stereoscopic 3D images. Typically, such systems utilize or generate separate virtual images for the left and right eye. These images are projected toward the user's left and right eyes through separate optics.

People have different distances between their eyes (inter-pupillary distance or IPD). The IPD for adults can range from about 50 millimeters to about 70 millimeters, which is a significant range of variation. To take this variation into account, adjustment of the HMD or SVD is required due to aberrations or stereo separation.

Aberrations include (but are not limited to) Geometric Lens distortion (the lens curves straight lines), transverse/lateral Chromatic Aberration (optics focus different wavelengths of light at different positions on the focal plane), Coma (a variation in magnification away from the center of the optic) and vignetting (image brightness changes from the center of the image). Stereo separation refers to the distance between each virtual image along the axis between two virtual cameras representing the human eyes.

To take these IPD-related effects into account, a HMD or SVD must have optics that can physically adjust to the spacing of the user's eyes or the content being shown on the system needs to be adjusted.

With a HMD/SVD that contains fixed optics (i.e., optics having a stereo separation distance that is fixed mechanically to a specific IPD distance), content will only look correct (e.g., reduced aberrations and correct 3D depth perception) if the user's IPD matches the IPD specified by the system's optical design (a HMD/SVD can be optically designed to deliver correct images to one specific IPD that can be different to the mechanical IPD of optics in the device). Therefore in a fixed optic system, to correctly display high quality images to users with varying IPDs that system must adjust the content that is displayed dynamically.

It is possible to correct the content being shown in software and/or hardware if the user's IPD is known. Hardware (cameras, infrared sensors, etc.) exist to measure the user's IPD, but these can add significant cost, complexity and additional power requirements to a system.

It is within this context that aspects of the present disclosure arise.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
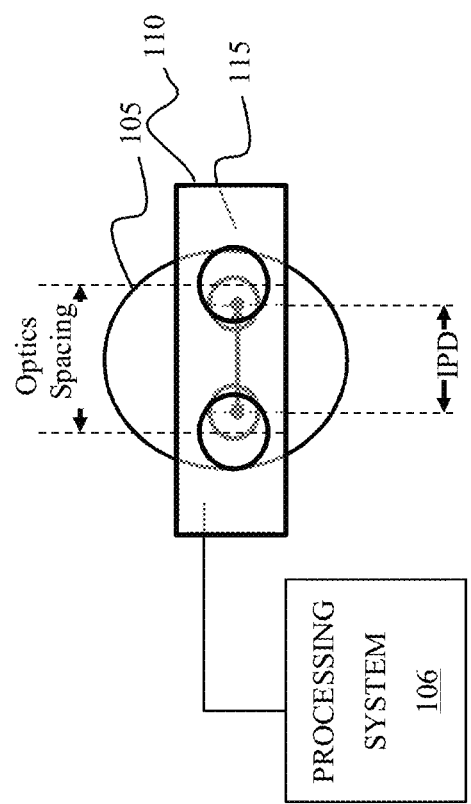
FIG. 1 is schematic diagram of a user viewing an image on a display device that displays stereoscopic images.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Aspects of the present disclosure include a simple "Digital IPD Adjustment" that enable a user to digitally adjust the content being displayed to match the user's IPD. This adjustment can be implemented in either software or hardware or some combination of software and hardware.

Aspects of the present disclosure include adjusting the content with software that acts on digital image content, but not as part of the original content creation process, however the software may also select pre-generated content for each adjustment.

Hardware may be used to apply an adjustment to a content video signal prior to it being displayed to the user through the optics.

The user can initiate the adjustment through suitably configured hardware, e.g., by buttons, sliders, dials, etc. on or near the HMD/SVD. Alternatively, the adjustment may be initiated by the user through software, e.g., by in-content menus or by a specific calibration process.

The calibration process may be implemented using a simple calibration screen that is displayed once the user presses the mentioned buttons, and the user can align colored objects until their color appears correct to the user prior to proper usage. Different forms of optical distortion correction can be applied based on the user's digital IPD selection, and a correct image can be shown to the user.

Once the adjustment is selected by the user, the above aberrations and/or stereo separation may be changed dynamically at an interactive rate such the user can see the effect of the adjustment within a short period of time. The user can then adjust the imaging of the HMD/SVD until the content looks correct to the user.

In addition, once the user has adjusted the HMD/SVD image quality to match their IPD, this adjustment (Digital IPD value) can be stored on the HMD/SVD or device connected to the HMD/SVD to be matched to the user. Therefore every time the user wears the HMD/SVD the content is adjusted to display correct for them and they no longer need to re-adjust.

An example of such user matching could include storing the "Digital IPD" value of the user in their profile/login on a computer or gaming system. Every time that user logs into their computer or gaming system, their IPD value is retrieved and the content on the HMD/SVD is adjusted for them.

Aspects of the present disclosure can include a calibration sequence that is integrated into other content, such as a game, to enhance the user experience and provide for more seamless operation and even perform the calibration without the user being aware that calibration is taking place.

Aspects of the present disclosure can include further optimization of an IPD calibration sequence by integrating the calibration sequence into content, such as, e.g., video content or game content rather than providing for a dedicated calibration sequence.

The problem of optical distortion due to eye shift (the human eye being shifted horizontally from the center axis of the optic) is depicted in FIG. 1. A user 105 looks into display device 110 to view a stereoscopic image. A processing system 106 sends a stereoscopic image to display device 110, which contain optics 115 corresponding to each of a user's eyes. However, in FIG. 1, the IPD of the user does not match up with the optics of the display device, resulting in aberrations perceived by the user.

Figure 2A:
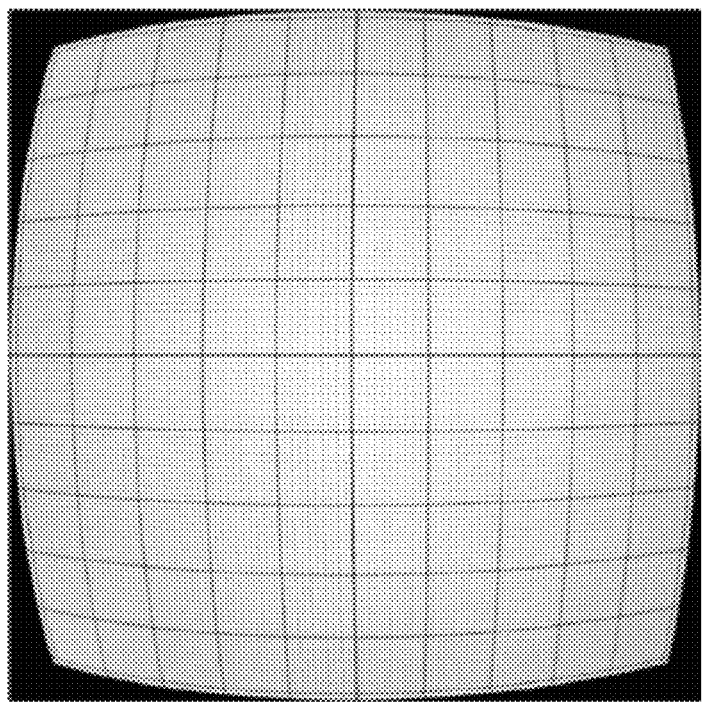
FIG. 2A is a simulated image of a graph paper through a center portion of lens.
Figure 2B:
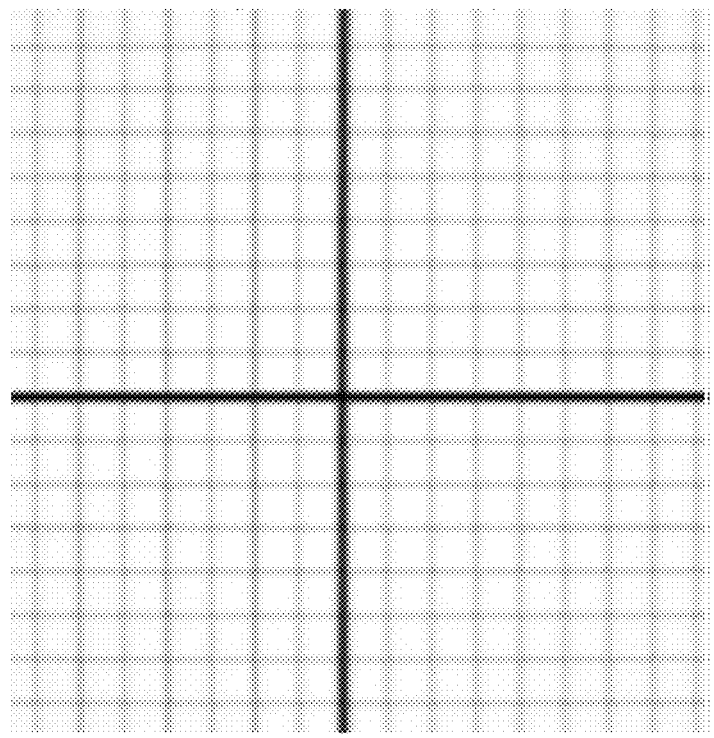
FIG. 2B is a magnification of the central part of the image in FIG. 2A.
Figure 2C:
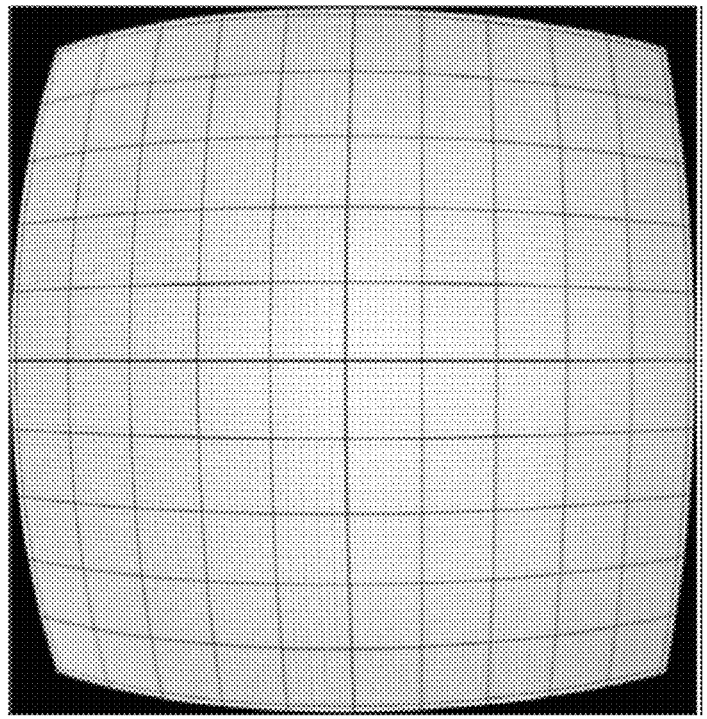
FIG. 2C is a simulated image of a graph paper through a point 2.5 mm left of center.
Figure 2D:
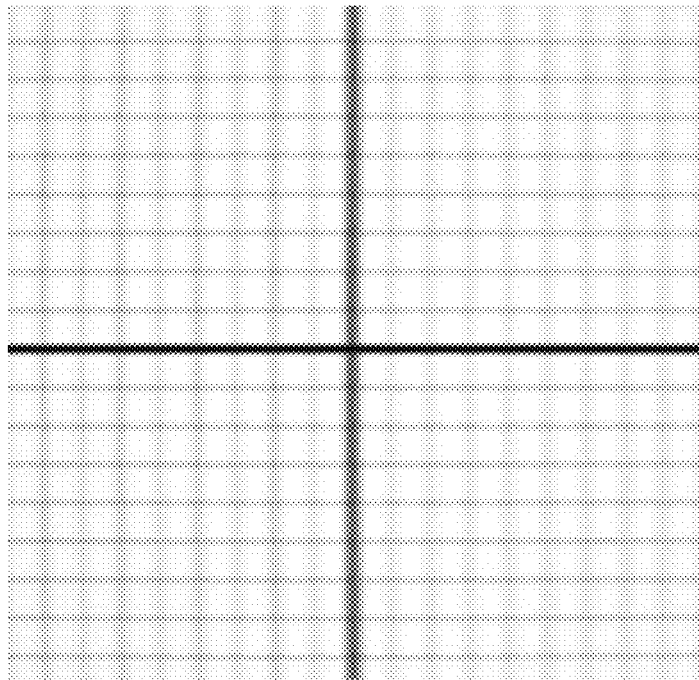
FIG. 2D is a magnification of the central part of the image in FIG. 2C.

The problem of optical distortion due to eye shift (the human eye being shifted horizontally from the center axis of the optic) is further exemplified in FIGS. 2A and 2B vs. FIGS. 2C vs. 2D. In these pictures you can see the geometric and chromatic aberration changes as the eye shifts from center to 2.5 mm to the left. The center image of FIGS. 2A and 2B was generated for an IPD of 63.5 mm and the image of FIGS. 2C and 2D show a 2.5 mm shift (a user with an IPD of 68.5 mm). The user with 68.5 mm IPD will get a slightly different image than the user with 63.5 mm. Chromatic aberration in the image of FIG. 2D may be exhibited in the form of fringing of colors in the centerline. This can be seen as a blurring of the vertical centerline in FIG. 2D compared to the relatively sharper centerline in FIG. 2B. It is noted that the original images were in color and the color fringing is exhibited as the blurring seen in the black and white images.

Through software warping, FIGS. 2C and 2D can be changed to appear the same as FIGS. 2A and 2B to a user with 68.5 mm IPD. There are various methods of software image warping and the present disclosure will not cover those in detail, however a simple example would be the following:

For a simple spherical image warp with linear correction of TCA (Transverse Chromatic Aberration):

$$R2=TX*TX+TY*TY$$

$$DX=TX+(TX*R2*K)$$

$$DY=TY+(TY*R2*K)$$

$$RX=(DX*K2)+K3$$

$$RY=(DY*K2)$$

$$GX=(DX*K4)+K5$$

$$GY=DY*K4$$

$$BX=(DX*K6)+K7$$

$$BY=DY*K6$$

TX,TY are input image coordinates
K is the amount spherical distortion
K2 is the amount of linear Red Transverse Chromatic Aberration
K3 is the amount Red Chromatic linear shift due to IPD
K4 is the amount of linear Green Transverse Chromatic Aberration
K5 is the amount Green chromatic linear shift due to IPD
K6 is the amount of linear Blue Transverse Chromatic Aberration
K7 is the amount Blue chromatic linear shift due to IPD
RX,RY is the output red image coordinates
GX,GY is the output green image coordinates
BX,BY is the output blue image coordinates In the above simple example, variables K3, K5, K7 are based on a user's IPD.

For example:

$$K3=\text{IPD in mm}*0.5*\text{Eye}(-1 \text{ for Left or 1 for Right})$$
$$*(\text{Image width in pixels/Display width in mm})$$

Using the examples above, the user can adjust the IPD value until the distorted image appears correct to them.

The calibration process may be based on a variation of IPD-dependent settings, such as stereo separation or chromatic adjustment (e.g., chromatic linear shift), until the image appears normal. By way of example and not by way of limitation, a calibration image can include a simple line or grid pattern. The calibration image may be generated in software or may be an image created by a graphic designer. The stereo separation of two such images can be changed in software and a series of such images can be briefly presented by the display device. Each stereo separation value can be correlated to a corresponding IPD. The stereoscopic image distance may initially be set to an extreme value so that the user sees two images. The system can prompt the user to enter an input when the two images appear to fuse into a single image (e.g. stereo matching). The system can then set the IPD value for presentation of subsequent images to the IPD value that corresponds to the stereo separation when the user saw the images fuse.

The input from the user may be in any suitable form, e.g., press a button, click on an icon, a voice command, depending on the nature of the system that is used in conjunction with the display. By way of example, and not by way of limitation, if the display is used in conjunction with a video game console, the command may be entered through a button, joystick, or other control on a game controller.

By way of further non-limiting example, one user input could set the IPD-dependent image setting value and a second input could indicate that the image appears correct. The input that sets the value or indicates that the image appears correct may be in the form of, e.g., pressing an Up/Down button on the HMD/SVD or attached device (e.g., controller), moving a Slider on the HMD/SVD or attached device, rotating a dial on the HMD/SVD or attached device, adjusting a user interface (UI) component (virtual slider, buttons, etc.) in the content presented by the display.

The IPD selection may be quantized in discrete steps or may be analog. The process could be either in a special calibration sequence or within the content itself (e.g., within game title for video game implementations). The hardware/software performing the optical distortion correction could store pre-generated data per discrete IPD value and interpolate between to account for precise IPD adjustment.

To optimize the calibration process, the calibration screen image may be configured to take advantage of key features of human vision and stereoscopic display systems. First, the aberrations and effects of stereoscopic image distance tend to be most pronounced near the edges of the images. Second, visual acuity tends to be highest at the center of the field of vision. Since the aberrations are greatest near the edges of the image it is desirable to place noticeable parts of the pattern near the edges of the image. Placing the noticeable parts of the pattern, e.g., particularly dark or thick lines, near the edges of the image, particularly the left and/or right edges, may also draw the user's attention to the edges of the image and cause the user's eyes to rotate to focus on the edge of the image. Accordingly, the calibration sequence can be optimized to provide more accurate coincidence of the systems IPD display settings with the particular user's IPD.

By way of example and not by way of limitation, this can be accomplished using a calibration sequence that is implemented by prompting a user to focus on a left or right portion of the screen, or by otherwise drawing a user's eyes to focus on an aspect of the calibration image that is located on the edge or periphery of the displayed calibration image. By way of example, this can be accomplished by using a calibration image having substantially all of its noticeable image aspects located on peripheral portions of the displayed image, or by particularly emphasizing image aspects that are located on peripheral portions of the image (e.g., on extreme left or right portions).

Figure 3A:
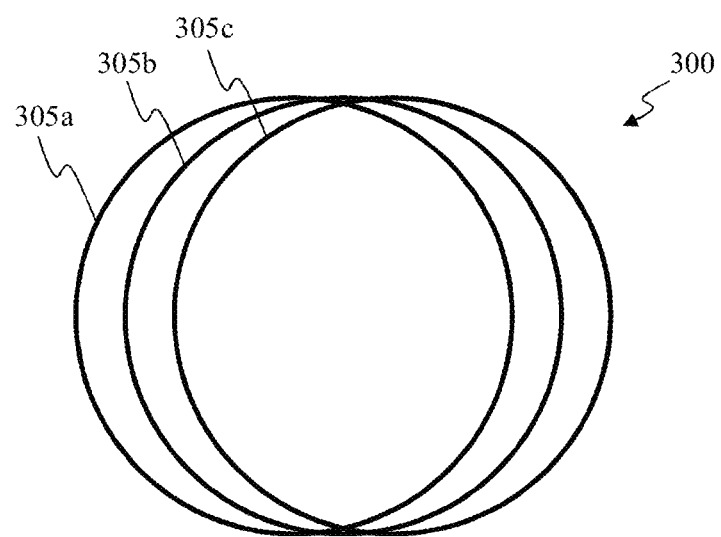
FIGS. 3A-3B depict an example of a calibration sequence to illustrate various aspects of the present disclosure.
Figure 3B:
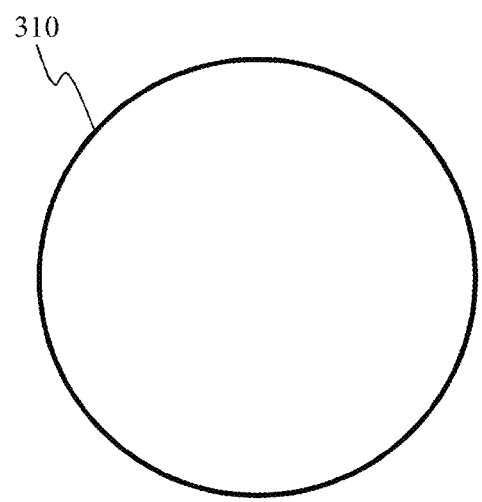

By way of example and not by way of limitation, the calibration image can include a set of colored rings whose circumferential edges are located on the periphery of the displayed calibration image, thereby drawing the user's attention to focus on the border of the rings. An example of such a calibration image sequence is depicted in FIGS. 3A-3B, which include particularly exaggerated and simplified aspects for purposes of illustration. Calibration image 300 includes a ring displayed stereoscopically to a user on a display device. In FIG. 3A, due to chromatic aberrations caused by the system's IPD not matching the user's IPD, the ring of the calibration image is initially perceived by the user as separated colored rings 305a, 305b, and 305c. The calibration sequence includes adjustment of one or more IPD-dependent display settings of the calibration image 300 in accordance with aspects mentioned herein, until it is perceived by the user as a single white ring 310 as depicted in FIG. 3B.

Accordingly, the user's attention is focused on the peripheral portions of the calibration image because particularly noticeable aspects of the calibration image, or even the only noticeable aspects of the calibration image (i.e., in this case, the border of the ring) is displayed on the peripheral portions of the calibration image. This draws the user's center of vision to the edges of the calibration image, focusing the user's center of vision, where visual acuity is the greatest, on the portions of the calibration image where IPD dependent aberrations are most pronounced. Furthermore, by using a calibration image that emphasizes aspects of the calibration image that are located on the edges or peripheral portions of the field of view, the user's center of vision can be drawn to those desired portions of the calibration image without a specific prompt (e.g. without explicitly telling the user to look to the right or left), providing for more seamless operation and enhancing the user experience.

By way of further example, the rings 305a, 305b, 305c can further include image aspects located in their centers, such as pronounced vertical and horizontal lines extending through their centers, to enable the user to first match up calibration images that include greatly exaggerated aberrations that are easily noticeable in the center of the calibration image, thereby providing an approximately optimized IPD dependent display setting, then enabling the user to fine tune the calibration by matching up the circumferential circular portions on the periphery of the image so that their color is perceived white, thereby providing more accurate IPD optimization of the display settings.

It is noted that the rings of FIGS. 3A-3B are but one example provided to illustrate various aspects of the present disclosure. Numerous other calibration images and sequences can be used consistent with the present disclosure, including but not limited to, triangles, squares, grids, lines, pictures and videos of objects, animals, people, etc.

Aspects of the present disclosure can be further extended to using hardware to determine the user's IPD automatically, or provide a rough approximation of the user's IPD that the user can further fine tune, or otherwise correct if inaccurate. This allows the possibility of using low cost hardware to gather an approximate measurement of the user's IPD that would be correct for the largest percentile of users, but still allow users to adjust more precisely if required.

Figure 4:
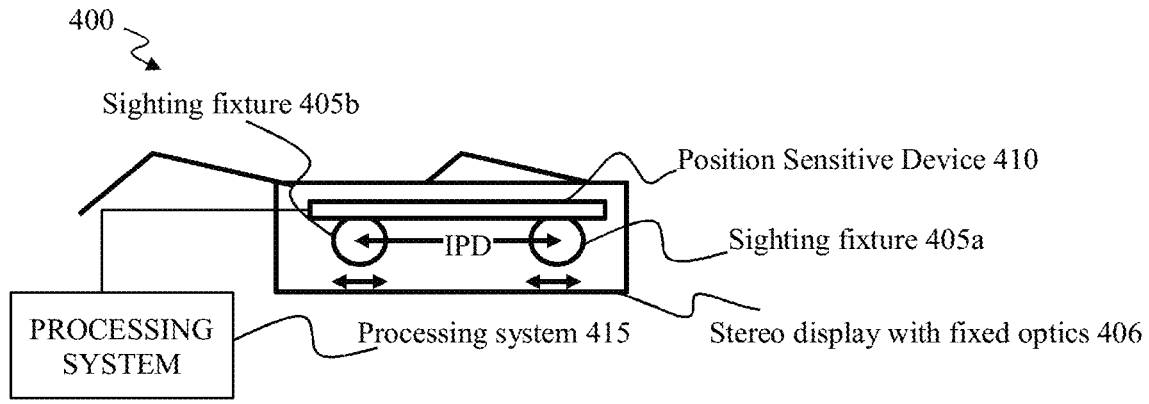
FIG. 4 is a schematic diagram depicting a low-cost hardware device for IPD adjustment according to various aspects of the present disclosure.

An example of a low cost hardware solution is depicted in FIG. 4, which depicts display device 400 that includes a set of spectacles with a pair of rings or other sight fixtures 405a, 405b. The sight fixtures 405a, 405b are slidable or otherwise mounted to the spectacles in a manner that enables them to slide or to laterally or otherwise move their position with respect to each other.

The sighting fixtures 405a, 405b could be mounted to a position sensitive device 410, e.g., a rheostat, that is calibrated to provide a signal proportional to the distance between sighting fixtures 405a and sighting fixture 405b. The user wears the device and adjusts the sighting fixtures 405a, 405b until each fixture is centered on a corresponding one of the user's eyes. The signal from the device can then be fed to a computer or other device including a processing system 415 that reads the IPD from the spacing between the sighting fixtures 405. IPD setting corresponding to the user can then be further fine-tuned digitally in conjunction with aspects of the present disclosure, if desired.

In some aspects, sighting fixtures 405 can be adjusted by way of a physical slider, knobs, buttons, touchscreen, etc. located on the device 400 or other part of the system which enable the user to physically adjust the location of the sighting fixtures to correspond to the user's eyes. In some aspects, the sighting fixtures may be adjusted by way of components already existing in the system, including but not limited to button presses on a game controller or remote control, keyboard strokes, mouse movements, etc. In some aspects, software from the processing system remaps functions of those existing control components upon initialization of a calibration sequence to correspond to adjustment of the sighting fixtures 405, and wherein the display device 400 further include an electric motor or other mechanism to electronically control the position of the sighting fixtures 405 relative to one another based on inputs received from the user. The device 400 can be incorporated into an HMD or SVD, or may be a separate standalone device. In the example illustrated in FIG. 4, the device 400 is incorporated into a stereo display 406 having fixed optics.

Because the greatest variation in IPD is a result of different user face shapes having eyes that are closer or further together, adjustability of sighting fixtures can be limited to relative adjustment in the horizontal direction to keep costs down. However, aspects of the present disclosure further include low cost hardware display device solutions that enable vertical adjustments of the sighting fixtures or other positional adjustments in addition to simply horizontal adjustment to provide even further adjustability for different face shapes and pupil positions of a user and enable increased comfort to a user looking into a stereoscopic display.

Figure 5:
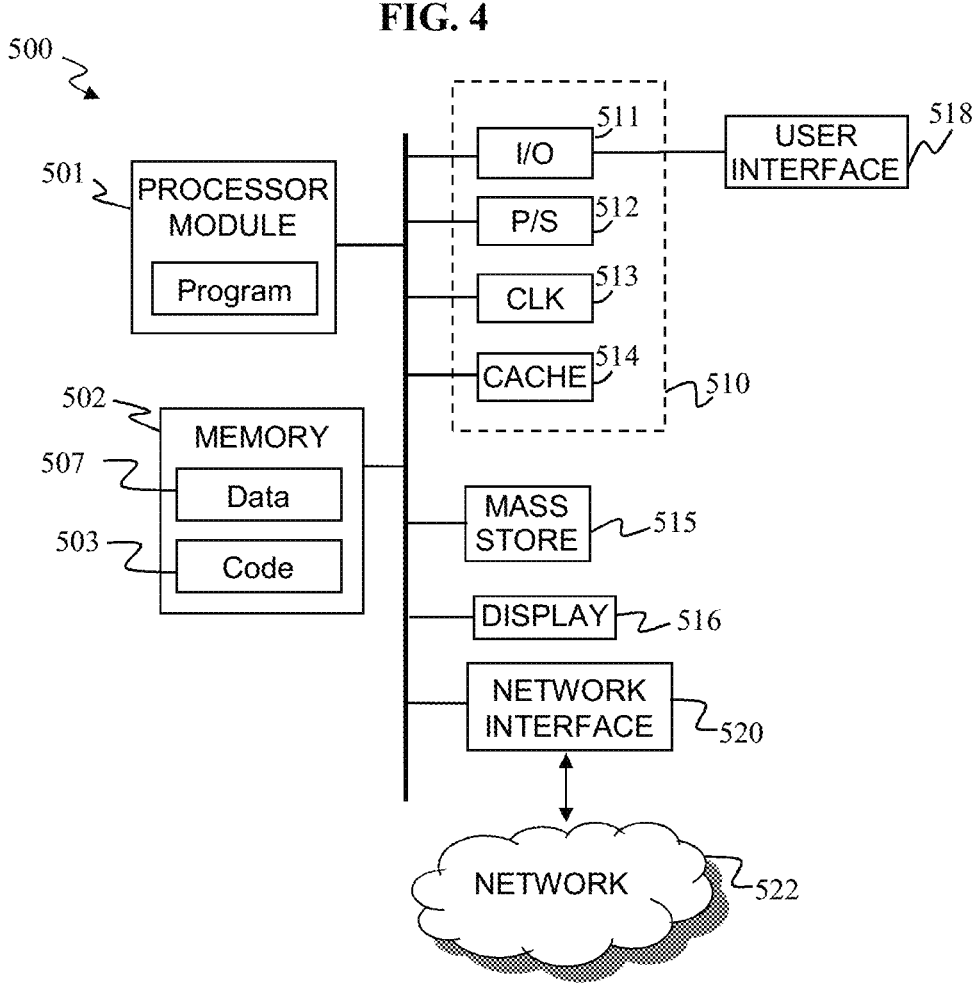
FIG. 5 is a schematic diagram of a system for performing IPD adjustment according to various aspects of the present disclosure.

Aspects of the present disclosure include systems configured to implement digital IPD adjustment of the various types described above. By way of example, and not by way of limitation, FIG. 5 illustrates a block diagram of a computer system 500 that may be used to implement IPD adjustment according to aspects of the present disclosure. The system 500 generally may include a main processor module 501, a memory 502, a display 516, and a user interface 518. The processor module 501 may include one or more processor cores, e.g., single core, dual core, quad core, processor-coprocessor, Cell processor, architectures, and the like.

The memory 502 may be in the form of an integrated circuit, e.g., RAM, DRAM, ROM, and the like. The memory may also be a main memory that is accessible by all of the processor cores in the processor module 501. In some embodiments, the processor module 501 may have local memories associated with one or more processor cores or one or more co-processors. An IPD adjustment program 503 may be stored in the main memory 502 in the form of processor readable instructions that can be executed by the processor module 501. The IPD program 503 may be configured enable digital IPD adjustment of an image to be displayed on display device 516, in accordance with various aspects of the present disclosure. The IPD adjustment program 503 may be written in any suitable processor readable language, e.g., C, C++, JAVA, Assembly, MATLAB, FORTRAN and a number of other languages.

Input or output data 507 may be stored in memory 502. During execution of the IPD adjustment program 503, portions of program code and/or data 507 may be loaded into the memory 502 or the local stores of processor cores for processing the processor 501. By way of example, and not by way of limitation, the input data 507 may include data corresponding to a signal received by a user indicating optimal IPD dependent display settings or data corresponding to and adjustment signal by a user for adjusting a calibration image, wherein the data 507 is received from user interface 518.

The system 500 may also include well-known support functions 510, such as input/output (I/O) elements 511, power supplies (P/S) 512, a clock (CLK) 513 and cache 514. The apparatus 500 may optionally include a mass storage device 515 such as a disk drive, CD-ROM drive, tape drive, or the like to store programs and/or data.

The device 500 may also include a display unit 516 and user interface unit 518 to facilitate interaction between the apparatus 500 and a user. The display unit 516 may be in the form of an HMD or SVD that displays text, numerals, graphical symbols or images. The user interface 518 may include a keyboard, mouse, joystick, light pen, or other device that may be used in conjunction with a graphical user interface (GUI). The display unit 516 and user interface unit 518 may also optionally be integrated into a single unit, such as, e.g., by way of sliders, buttons, or other controls provided on a SVD or HMD. The apparatus 500 may also include a network interface 520 to enable the device to communicate with other devices over a network 522, such as the internet. The system 500 may receive one or more frames of streaming data (e.g., one or more encoded image frames) from other devices connected to the network 522 via the network interface 520. These components may be implemented in hardware, software, or firmware, or some combination of two or more of these.

Figure 6:
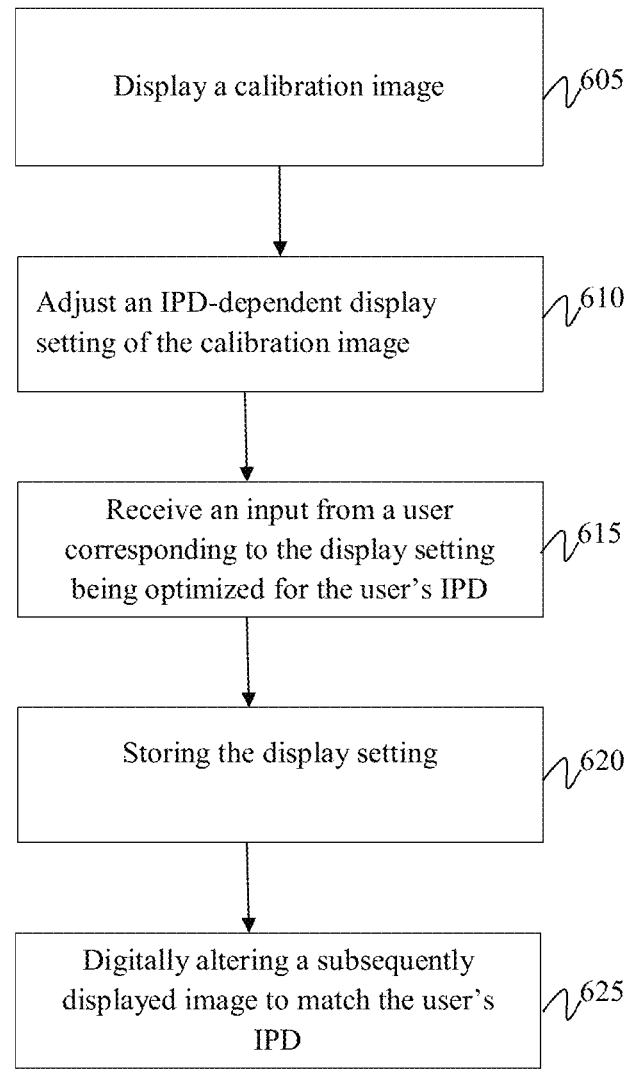
FIG. 6 is a diagram describing the instructions for executing an operation for IPD adjustment according to various aspects of the present disclosure.

A method for digital IPD adjustment in accordance with various aspects of the present disclosure is depicted in FIG. 6. The method 600 can be used for adjustment of a stereoscopic image to optimize viewing for a particular user's IPD. The method 600 includes displaying a calibration image 605 on a display device having stereoscopic viewing capabilities. The method 600 further includes adjusting one or more IPD-dependent display settings of the calibration image 610. Method further includes receiving an input from the user 615 corresponding to the one or more IPD-dependent display settings being optimized for the particular IPD of the user. The method 600 further includes storing the one or more optimized IPD dependent display settings 620. Method 600 further includes digitally altering a subsequently displayed image 625 to optimize the subsequently displayed image for the user's IPD based on the stored display setting.

The method 600 can be executed by a computer or other processing system, wherein the one or more stored IPD dependent display settings are used to optimize a subsequent viewing experience on a display device for a user.

The method 600 can further include various aspects according to the present disclosure.

The method 600 can be implemented in program instructions embodied in a non-transitory computer readable medium and executable by a system for IPD adjustment, according to various aspects of the present disclosure.

Aspects of the present disclosure provide for a relatively inexpensive and simple adjustment of stereoscopic viewing devices or head mounted displays to take into account differences in users' inter-pupillary distance. Modification of the display or viewing device is not required. This allows for adjustment of displays with fixed viewing optics.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
   determining an inter-pupillary distance (IPD) value with a processor from a signal from a position sensitive device coupled to two moveable sighting fixtures mounted to a head mounted display (HMD) having two fixed optics configured for a specific inter-pupillary distance, the position sensitive device being configured to produce a signal that corresponds to a distance between the two sighting fixtures; and warping images with the processor to optimize display of the images with the two fixed optics for the determined IPD value.

2. The method of claim 1, wherein warping the images includes correcting the images for one or more aberrations.

3. The method of claim 1, wherein the aberrations include geometric lens distortion, chromatic aberration, coma, vignetting or a combination thereof.

4. The method of claim 1, further comprising storing the setting of IPD for the user in digital memory.

5. The method of claim 4, further comprising automatically adjusting images presented on the display using the stored setting of IPD for the user.

6. An apparatus, comprising:
a computer processing system configured, by suitable programming, to perform a method comprising:
determining an inter-pupillary distance (IPD) value from a signal from a position sensitive device coupled to two moveable sighting fixtures mounted to a head mounted display (HMD) having two fixed optics configured for a specific inter-pupillary distance, the position sensitive device being configured to produce a signal that corresponds to a distance between the two sighting fixtures; and
warping images with the computer processing system to optimize display of the images with the two fixed optics for the determined IPD value.

7. The apparatus of claim 6, wherein warping the images includes correcting the images for one or more aberrations.

8. The apparatus of claim 6, wherein the aberrations include geometric lens distortion, chromatic aberration, coma, vignetting or a combination thereof.

9. The apparatus of claim 6, wherein the method further comprises storing the setting of IPD for the user in digital memory.

10. The apparatus of claim 9, wherein the method further comprises automatically adjusting images presented on the display using the stored setting of IPD for the user.

11. The apparatus of claim 6, further comprising the head mounted display HMD having two fixed optics configured for a specific inter-pupillary distance.

12. The apparatus of claim 6, further comprising the position sensitive device coupled to two moveable sighting fixtures.

13. The apparatus of claim 6, further comprising the position sensitive device coupled to two moveable sighting fixtures and the head mounted display (HMD) having two fixed optics configured for a specific inter-pupillary distance.

14. A non-transitory computer readable medium containing program instructions for inter-pupillary distance (IPD) adjustment on a display device comprising fixed optics, wherein execution of the program instructions by one or more processors of a processing system causes the one or more processors to carry out an IPD adjustment method, the IPD adjustment method comprising
determining an inter-pupillary distance (IPD) value from a signal from a position sensitive device coupled to two moveable sighting fixtures mounted to a head mounted display (HMD) having two fixed optics configured for a specific inter-pupillary distance, the position sensitive device being configured to produce a signal that corresponds to a distance between the two sighting fixtures; and
warping images with the processing system to optimize display of the images with the two fixed optics for the determined IPD value.

15. The non-transitory computer readable medium of claim 14, wherein warping the images includes correcting the images for one or more aberrations.

16. The non-transitory computer readable medium of claim 14, wherein the aberrations include geometric lens distortion, chromatic aberration, coma, vignetting or a combination thereof.

17. The non-transitory computer readable medium of claim 14, wherein the IPD adjustment method further comprises storing the setting of IPD for the user in digital memory.

18. The non-transitory computer readable medium of claim 17, wherein the IPD adjustment method further comprises automatically adjusting images presented on the display using the stored setting of IPD for the user.

* * * * *